(12) United States Patent
Aubry et al.

(10) Patent No.: US 12,189,086 B2
(45) Date of Patent: Jan. 7, 2025

(54) OPTICAL TRANSMISSION ELEMENT, HAVING A SUPER-HYDROPHOBIC NANOSTRUCTURED SURFACE HAVING AN ANTI-REFLECTIVE PROPERTY AND COVERED WITH A COMPLIANT HIGH-DENSITY THIN FILM DEPOSIT

(71) Applicant: THALES, Courbevoie (FR)

(72) Inventors: Raphaël Aubry, Palaiseau (FR); Gaëlle Lehoucq, Palaiseau (FR); Raphaël Guillemet, Palaiseau (FR); Julie Cholet, Palaiseau (FR); José-Paolo Martins, Palaiseau (FR); Mane-Si-Laure Lee Bouhours, Palaiseau (FR); Anne Delboulbe, Palaiseau (FR)

(73) Assignee: THALES, Courbevoie (FR)

( * ) Notice: Subject to any disclaimer, the term of this patent is extended or adjusted under 35 U.S.C. 154(b) by 793 days.

(21) Appl. No.: 17/436,978

(22) PCT Filed: Mar. 4, 2020

(86) PCT No.: PCT/EP2020/055608
§ 371 (c)(1),
(2) Date: Sep. 7, 2021

(87) PCT Pub. No.: WO2020/178304
PCT Pub. Date: Sep. 10, 2020

(65) Prior Publication Data
US 2022/0179127 A1    Jun. 9, 2022

(30) Foreign Application Priority Data

Mar. 7, 2019 (FR) .................................. 1902313

(51) Int. Cl.
*G02B 1/00* (2006.01)
*G02B 1/18* (2015.01)

(52) U.S. Cl.
CPC .......... *G02B 1/18* (2015.01); *G02B 2207/101* (2013.01)

(58) Field of Classification Search
CPC ...... G02B 1/18; G02B 2207/101; G02B 1/14; G02B 1/118
See application file for complete search history.

(56) References Cited

U.S. PATENT DOCUMENTS

2010/0033819 A1* 2/2010 Schulz .................. G02B 1/118
                                                              359/507
2017/0082783 A1 3/2017 Boyd et al.

FOREIGN PATENT DOCUMENTS

WO    2008/104150 A1    9/2008

OTHER PUBLICATIONS

Miller, et al., "Diamond coatings for IR window applications", Diamond and Related Materials, vol. 6, Issues 2-4, pp. 386-389, Mar. 1997.

(Continued)

*Primary Examiner* — Euncha P Cherry
(74) *Attorney, Agent, or Firm* — BakerHostetler

(57) ABSTRACT

An optical element is provided, which is transparent at a wavelength of use λ, and which has a super-hydrophobic nanostructured surface that has an anti-reflection property, the surface having an array of pads. —The pads have a nanoscale width, a height h, an aspect ratio of less than 1/2, and the pitch p of the array is such that p<h and the element comprises a top layer of thickness less than h/5 which covers without discontinuity and conformally the nanostructured surface, the top layer being obtained via a step of annealing at a temperature comprised between 500° C. and 1200° C.

(Continued)

and being in a material of a hardness greater than the hardness of the material of said nanostructured surface.

11 Claims, 4 Drawing Sheets

(56) References Cited

OTHER PUBLICATIONS

Pierson, "Chapter 14: Diamond- Like Carbon (DLC)", Handbook of carbon, graphite, diamond and fullerenes: properties, processing and applications, Noyes Publications, pp. 337-355, Jan. 1, 1993.
Leem, et al., "Enhanced transmittance and hydrophilicity of nanostructured glass substrates with anti-reflective properties using disordered gold nanopatterns", Optics Express, vol. 20, No. 4, pp. 4056-4066, 2012.
Boyd, et al. "Periodically patterned germanium surfaces modified to form superhydrophobic, IR-transmissive substrates", Optical Materials Express, vol. 6, No. 10, pp. 3254-3261, 2016.
Infante, et al., "Durable, superhydrophobic, antireflection, and low haze glass surfaces using scalable metal dewetting nanostructuring", Nano Research, vol. 6, No. 6, pp. 429-440, 2013.
English translation of Substantive Examination Report issued in Saudi Arabian Patent Application No. 521430261, dated Dec. 22, 2022.

* cited by examiner

OPTICAL TRANSMISSION ELEMENT, HAVING A SUPER-HYDROPHOBIC NANOSTRUCTURED SURFACE HAVING AN ANTI-REFLECTIVE PROPERTY AND COVERED WITH A COMPLIANT HIGH-DENSITY THIN FILM DEPOSIT

CROSS-REFERENCE TO RELATED APPLICATIONS

This application is a National Stage of International patent application PCT/EP2020/055608, filed on Mar. 4, 2020, which claims priority to foreign French patent application No. FR 1902313, filed on Mar. 7, 2019, the disclosures of which are incorporated by reference in their entirety.

FIELD OF THE INVENTION

The invention relates to an element that is optical in transmission, which has at least one super-hydrophobic nanostructured surface that has an anti-reflection property and that is covered with a conformal thin-film deposit of high hardness, and to a process for manufacturing such an element.

BACKGROUND

In many applications, especially in optics, it is desirable to produce optical elements having a hydrophobic or super-hydrophobic surface, in order to prevent drops of water from adhering to their surface and thus to facilitate use and cleaning thereof. It is known to deposit, on a smooth optical element, a hydrophobic coating that is also smooth, thus making the element less easy to dirty and facilitating cleaning thereof when it is wetted. Generally, these hydrophobic coatings include fluorine-containing compounds such as fluorosilanes and fluorosilazanes. These non-textured hydrophobic coatings (smooth surface) allow limited contact angles with water, not exceeding about 115°, to be obtained, this possibly being insufficient in certain applications. A surface is said to be hydrophobic when it has a contact angle with water greater than 90° and is said to be superhydrophobic when it has a contact angle with water greater than 120°, and preferably 130° to 160° or more. Hydrophobic and superhydrophobic surfaces are self-cleaning, easy to clean, anti-fingerprint and anti-bacterial. It is known that a hydrophobic smooth surface may be made superhydrophobic by virtue of a combination of structures of micron or submicron size and a surface chemistry (silanization). These structures are called SWSs, for "sub-wavelength structures", when they are of sizes smaller than the wavelength of use of the optical component. The structuring of the surface must be fine enough to generate a superhydrophobic effect. The effect of the roughness or structuring of the surface is to trap air in the structure, and a drop of water then rests on a composite surface made of solid and air. This effect, commonly called the "fakir" effect, allows high contact angles (~160°) and a quite low contact-angle hysteresis (less than 30°) to be obtained. In addition, these SWSs may be used to give anti-reflection properties to the optical elements for which they are designed. Conventionally, optical elements such as lenses or display devices are treated with mono- or multi-layer anti-reflection coatings that allow optical losses due to reflections to be avoided. However, these coatings have many disadvantages: restricted ranges of wavelengths of use and of angle of incidence, thermal expansion and resistance to laser flux. SWSs used as an anti-reflection solution allow most of these problems to be overcome.

It is known to use periodic SWS nanostructures to impart superhydrophobic (SH) and antireflection (AR) properties to a glass that is transparent in the visible (Leem, Jung Woo, Yunhae Yeh, and Jae Su Yu. "Enhanced transmittance and hydrophilicity of nanostructured glass substrates with anti-reflective properties using disordered gold nanopatterns." Optics Express 20.4 (2012): 4056-4066). It is known to nanostructure a germanium optical element using nanostructures with a high aspect ratio, with a view to making it superhydrophobic, to increasing its transmission in the infrared and to facilitating its use in a wet or humid environment (Boyd, Darryl A., et al. "Periodically patterned germanium surfaces modified to form superhydrophobic, IR-transmissive substrates." Optical Materials Express 6.10 (2016): 3254-3261). Optical surfaces using SWSs are therefore ideal candidates for camera portholes, binoculars or anti-reflection windows in observation systems intended for use in maritime environments, for example. However, these nanostructures are rapidly degraded under difficult conditions of use (rain, hail, sand erosion, etc.), this greatly limiting the durability of the SH and AR properties of these optical elements in these environments.

Although a special effort has been made to develop resistant SWSs (see Infante, Daniel, et al. "Durable, superhydrophobic, antireflection, and low haze glass surfaces using scalable metal dewetting nanostructuring." Nano Research 6.6 (2013): 429-440), the latter remain mechanically unstable and fragile. They are unable to resist difficult environmental stresses. This feature of SWSs greatly limits the conditions of use and/or the durability of the SH and AR properties of optics using these structures. There are currently no techniques that allow SWSs on optical elements to be effectively protected while keeping their optical properties.

The invention aims to solve the problems of the prior art and particularly to obtain an optical component comprising, on its surface, nanostructures that are resistant to severe conditions and that provide the optical component with durable SH and AR properties.

SUMMARY

Thus, one subject of the invention is an optical element, which is transparent at a wavelength of use $\lambda$, and which has a super-hydrophobic nanostructured surface that has an anti-reflection property, said surface comprising an array of pads, characterized in that the pads have a nanoscale width, a height h, an aspect ratio of less than 1/2, in that the pitch p of the array is such that p<h and in that the element comprises a top layer of thickness less than h/5 which covers without discontinuity and conformally said nanostructured surface, said top layer being obtained via a step of annealing at a temperature comprised between 500° C. and 1200° C. and being in a material of a hardness greater than the hardness of the material of said nanostructured surface.

According to particular embodiments of the invention:
the pads are cylinders, cones or truncated cones;
the array of pads is periodic;
the top layer is made of alumina, preferably in sapphire phase, of DLC or of $ZrO_2$;
the nanostructured surface is made of germanium and the wavelength of use is comprised between 8 and 12 µm;
the pads have an aspect ratio of less than 1/10;
the thickness of the top layer is less than h/10;

the material of the top layer has a hardness greater by at least 1.3 units on the Mohs scale than the hardness of the material of the nanostructured surface.

Another subject of the invention is a process for manufacturing an optical element as claimed in any one of the preceding claims, comprising the following steps:
a. nanostructuring the array of pads on the surface of the optical element
b. depositing the top layer by atomic layer deposition (ALD), so as to cover the nanostructured surface conformally and without discontinuity.

According to particular embodiments of the invention:
the process comprises, after step b), a step c) of annealing the top layer at a temperature comprised between 500° C. and 1200° C.,
the nanostructuring step, step a), comprises 3 sub-steps:
placing a lithographed hard mask on the surface to be nanostructured
etching via plasma, ionic or chemical etches or combinations of these techniques the array of pads on said surface to be nanostructured
removing the hard mask.

DESCRIPTION OF THE DRAWINGS

Other features, details and advantages of the invention will become apparent on reading the description, which is given with reference to the appended drawings, which are given by way of example and which show, respectively.

DETAILED DESCRIPTION

In the figures, elements that are identical have been designated with the same references.

By array of pads, what is meant is the spatial arrangement or pattern of the pads on the nanostructured surface. This pattern is not necessarily periodic.

By "periodic" array of pads, what is meant is pads which recur with a set pitch at ±10%.

In the case where the array is not periodic, by "pitch" of the array of pads what is meant is the minimum distance between the center of any pad of the array and the center of its nearest neighbor.

By "nanoscale" dimension of an object, what is meant is a maximum dimension strictly less than 7.5 µm.

By "vertical", what is meant is a direction perpendicular to the surface.

By "aspect ratio" of an object, what is meant is the ratio between its width and its height. By "width", what is meant is the largest dimension in the plane tangent to the surface, and by height what is meant is the largest dimension perpendicular to the tangent to the surface.

By "transparent", what is meant here is a transmission greater than 50%, preferably 75% and even more preferably 95% at one wavelength or in an illumination wavelength range.

In order to overcome the problem of the fragility of the nanostructures giving SH and AR properties to the surface of optical components, the invention proposes to cover these nanostructures with a thin conformal layer having a high hardness. It is known practice to protect nanostructured optical components by covering them with "hard" materials, such as DLC (for diamond-like carbon) for example, deposited by CVD or PVD techniques. DLC is deposited more on planar surfaces. DLC alone exhibits hydrophobic properties. DLC is a material of high hardness (~25 GPa) and which also has a hydrophobic character that is modulable via the deposition conditions. However, it is difficult with deposition by PECVD to obtain a conformal profile on nanostructured surfaces having a high aspect ratio such as that used to achieve SH and AR properties. However, keeping the shape of the nanostructures is essential to meeting optical specifications. The conformity and small thickness of the layer covering the nanostructures is therefore essential. It will be recalled that the hardness of a material is defined by the resistance that the surface of said material shows to the penetration of a harder body.

Figure 1:
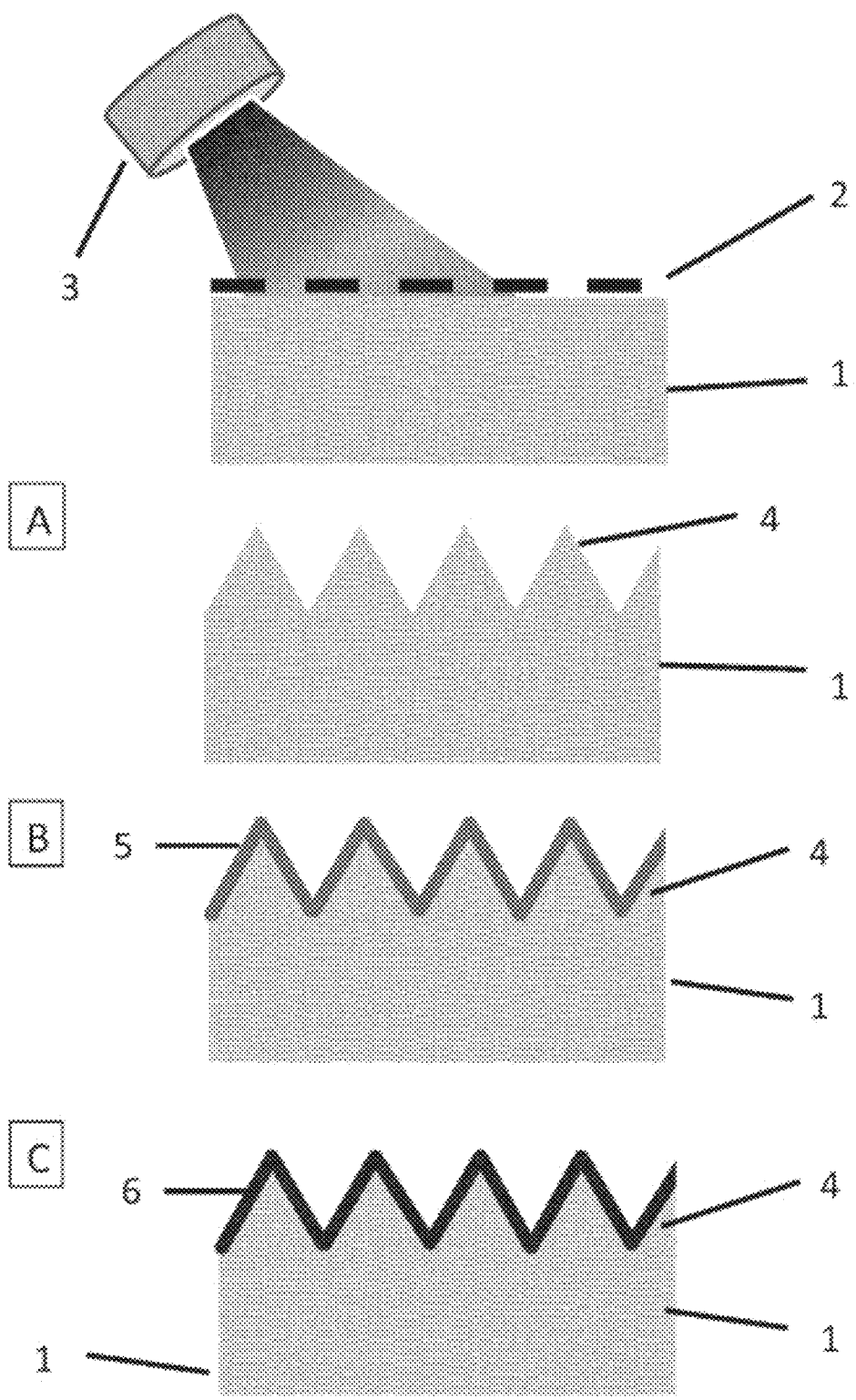
FIG. 1 a schematic of a process for manufacturing an optical element, which is transparent at a wavelength of use or at a range of wavelengths, and which has a super-hydrophobic nanostructured surface that has an anti-reflection property, according to one embodiment of the invention.

FIG. 1 shows a schematic of the process for manufacturing an optical element, which is transparent at at least one wavelength of use 2 and which has a super-hydrophobic nanostructured surface that has an anti-reflection property, according to one embodiment of the invention. In the embodiment of FIG. 1, an optical component (1) is made of germanium and the wavelength of use is comprised between 8 and 12 µm. By way of reference, a layer of germanium of 5 mm thickness has a transmission of about 50%, corresponding to a transmission of about 70% per face for a normal incidence between 8 and 12 µm. This is a material particularly used to produce optics in the domain of the thermal infrared. The optical component 1 may be a window, a lens, a porthole or any other optical element that is transparent at the wavelength or in the range of wavelengths of use. The surface to be nanostructured of the optical component (1) need not be planar, but may be convex or concave for example. The manufacturing process may be broken down into a plurality of steps.

In step A, a metal film or mask (2) is defined by nano-printing on the optical component (1). In another embodiment, the mask is a hard mask obtained by lithography (optical lithography, block-copolymer lithography or colloidal lithography). The metal film or hard film then serves as a mask in the step of etching the germanium via plasma, ionic or chemical etches or combinations of these techniques. In one embodiment, this etching is carried out using an ICP plasma source (3) (ICP being the acronym of inductively coupled plasma) because this type of source allows nanostructures with aspect ratios of up to 1/15 or less, which are not achievable with purely chemical etches, to be etched. Specifically, such a source allows plasmas of very high density to be generated, allowing very vertical sidewalls to be etched. The etching process is carried out by deep reactive ion etching (DRI etching) using an ICP source.

Once the etching step A has finished, the mask is removed. The germanium optical element (1) then has a nanostructured surface (4). The physical parameters of the nanostructures are detailed in the description of FIG. 3. Here it will merely be mentioned that, in the embodiment of FIG. 1, the nanostructures are cones of height h, having an aspect ratio generally less than 1/2 and which are arranged in a periodic array of pitch p such that p<h.

These physical parameters are chosen so that the nanostructured surface (4) gives, to the optical element (1), AR properties, at the wavelength of use 2 and at the angles of incidence of use, and SH properties. The AR effect is due to the gradual variation in effective refractive index caused by the nanostructured surface, which acts as a pseudo-layer the effective refractive index of which varies between the index of air and the refractive index of the material from which the optical element (1) is made. Concretely, the height is computed parametrically to maximize the transmission of the surface depending on the range of wavelengths and of angles of incidence of use.

As mentioned above, and depending on the materials used, these nanostructures may be fragile and highly likely to degrade under difficult environmental conditions. To overcome this drawback, step B consists in depositing a top layer of a material of a hardness greater than the hardness of the material from which the nanostructured surface (4) is composed, so as to cover without discontinuity and conformally said nanostructured surface. Preferably, the top layer has a hardness greater by at least 1.3 units on the Mohs scale than the hardness of the material from which the nanostructured surface is composed. The thickness of the conformal top layer is small, so as to retain the AR and SH properties of the optical element. Specifically, too large a thickness (or a non-conformal layer) would effectively protect the nanostructures but would decrease their aspect ratio and therefore would negatively impact the SH and AR effect. In the embodiment of FIG. 1, the conformal top layer (5) is made of alumina and is deposited by atomic layer deposition (ALD). This alumina layer is amorphous and has a thickness less than h/5 and greater than h/1000. Alumina (~16 GPa) has a hardness twice as high as germanium 8 GPa) and thus allows the nanostructured surface (4) to be protected and the mechanical resistance of the optical element to be increased by increasing its hardness and its tenacity. In addition, the conformal top layer acts as an anti-corrosion layer allowing the germanium to withstand maritime environments.

In order to increase the hardness of the alumina from which the conformal top layer is composed, the manufacturing process of FIG. 1 comprises a last step C of applying a thermal anneal to the optical element. In the embodiment of FIG. 1, the anneal is carried out at a temperature of 900° C., promoting crystallization of the alumina and the appearance of a rhombohedral phase belonging to the sapphire phase of alumina (6). Step C allows the final germanium optical element (10) to be obtained, this element being transparent between 8 and 12 µm and having an SH nanostructured surface that has an AR property, these properties being made durable by the deposition of the conformal top layer. The hardness of the sapphire phase of alumina is 25 GPa), this enabling greater protection of the nanostructured layer (4). In another embodiment, the step of applying a thermal anneal to the alumina is carried out at a temperature comprised between 500° C. and 1200° C. via standard or rapid thermal annealing (RTA) or even laser annealing. In another embodiment, the material from which the top layer is made is DLC or ZrO2, for example.

Figure 2:
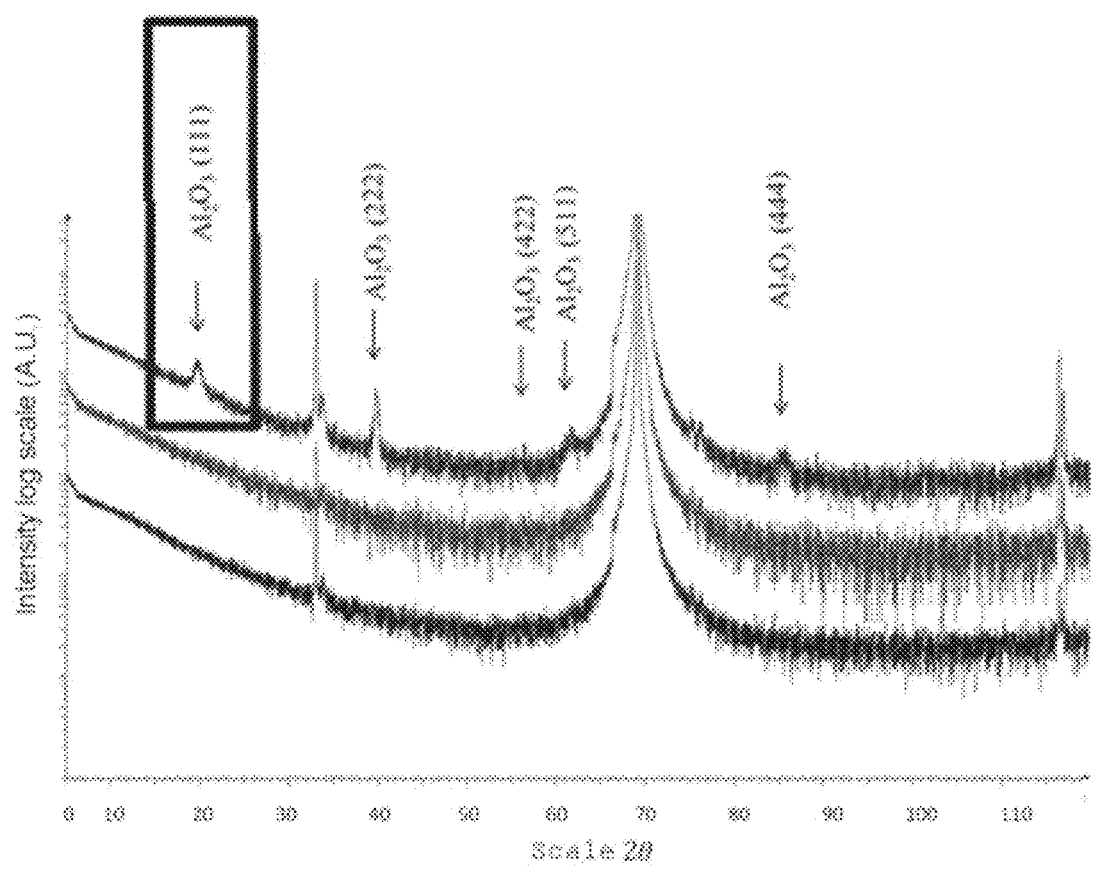
FIG. 2 an XRD spectrum (XRD being the acronym of X-ray diffraction) of an unstructured AlO3 layer.

In order to confirm the appearance of the sapphire phase of alumina, an XRD spectrum (XRD being the acronym of X-ray diffraction) of an alumina layer deposited on a silicon substrate is carried out. FIG. 2 shows the result of this measurement. The x-axis represents the angles of the diffraction peaks associated with the various crystal structures and the y-axis corresponds to the logarithm of the intensity of the various diffraction peaks. The bottom curve corresponds to the analysis of the silicon substrate alone. The curve comprised between the two curves corresponds to the spectrum of the amorphous alumina layer (5) of 200 nm thickness deposited by ALD on the silicon substrate. Lastly, the top curve corresponds to the spectroscopy of the alumina layer (6) after thermal annealing at a temperature of 900° C. The appearance, on the top curve, of the diffraction peak corresponding to the sapphire phase of the alumina layer (6) obtained after thermal annealing (black rectangle) at 900° C. of the alumina layer (5) deposited by ALD may very clearly be seen. This diffraction peak is obviously not observable during the analysis of the alumina layer (5) before thermal annealing.

Figure 3:
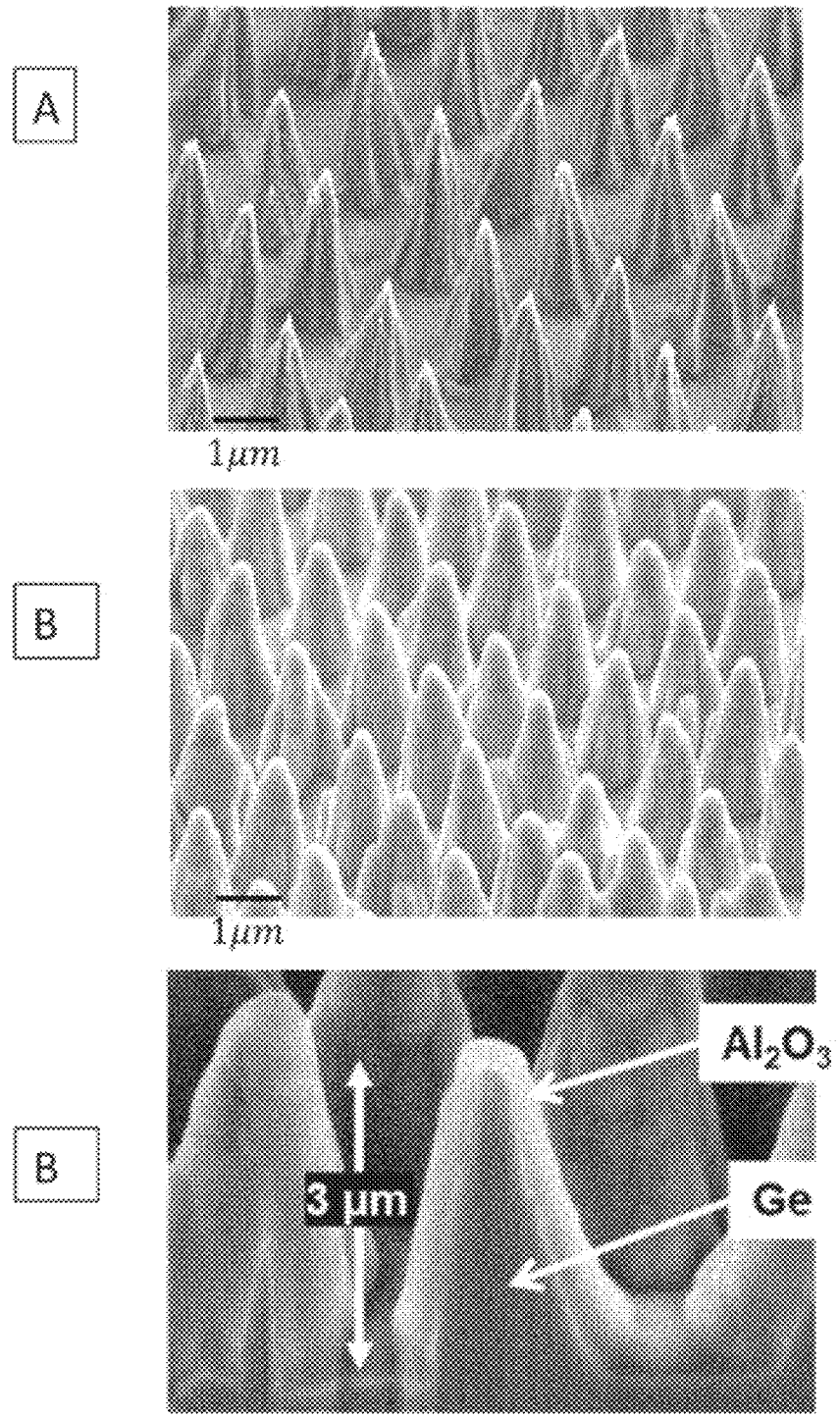
FIG. 3 three SEM images (SEM being the acronym of scanning electron microscope) of an optical element at various stages of the manufacturing process of FIG. 1.

FIG. 3 groups together three SEM images (SEM being the acronym of scanning electron microscope) of the nanostructured germanium surface of the optical element obtained using the manufacturing process of FIG. 1 at various stages of the manufacturing process.

Image A is an SEM image of the nanostructured germanium surface after step A of a manufacturing process similar to that of FIG. 1. The nanostructures produced by plasma etching using an ICP source are cones of height h=3.2 µm and of aspect ratio R=L/h=1/6, L being the width of the cones. The cones are distributed in a regular array with a pitch of periodicity p=1.6 µm. These cone parameters allow SH and AR properties to be given to the nanostructured surface. Generally, an aspect ratio of less than 1/2 and preferably less than 1/3 is sufficient to obtain SH properties.

In another embodiment, the nanostructures have a height h such that h<$\lambda$, with an aspect ratio R<1/10 and an array pitch p such that p<h. In one alternative embodiment, the nanostructures patterned on the surface are not arranged periodically but with a sufficiently small array pitch (or a sufficiently dense array) to obtain an SH and AR effect. In this case, the minimum distance between any cone of the array and its nearest neighbor is comprised between h/3 and 2h/3. The nanostructures may be pads, cylinders or cones or truncated cones. By cylinder, what is meant here is any solid the lateral surface of which is a ruled surface the generatrices of which are parallel, this including parallelograms for example. By cone, what is meant is any solid the lateral surface of which is a ruled surface the generatrices of which pass through a given point (the vertex), this including pyramids for example.

Image B1 of FIG. 3 shows the nanostructured surface (4) of the optical element, as obtained after step B of the manufacturing process of FIG. 1. Here, the nanostructured surface (4) is covered without discontinuity by the conformal top layer of alumina, which is 200 nm thick, using ALD. In another embodiment the thickness e of the top layer is less than h/5, preferably less than h/10 and more preferably less than h/20. Since alumina is harder than germanium (16 GPa vs 8 GPa), this conformal layer allows the nanostructures to be protected while keeping the SH and AR properties of the surface. In another embodiment, the deposit of the conformal top layer is made of a material at least two times and preferably three times harder than that from which the nanostructured surface of the optical element (1) is composed.

The image B2 corresponds to a cross-sectional view of image B1 of FIG. 3 produced using a focused ion beam. This cross section allows the conformity of the alumina layer (5) deposited by ALD to be observed. It will be recalled that the nanostructures are 3.2 µm high and that the alumina layer is 200 nm thick.

Figure 4:
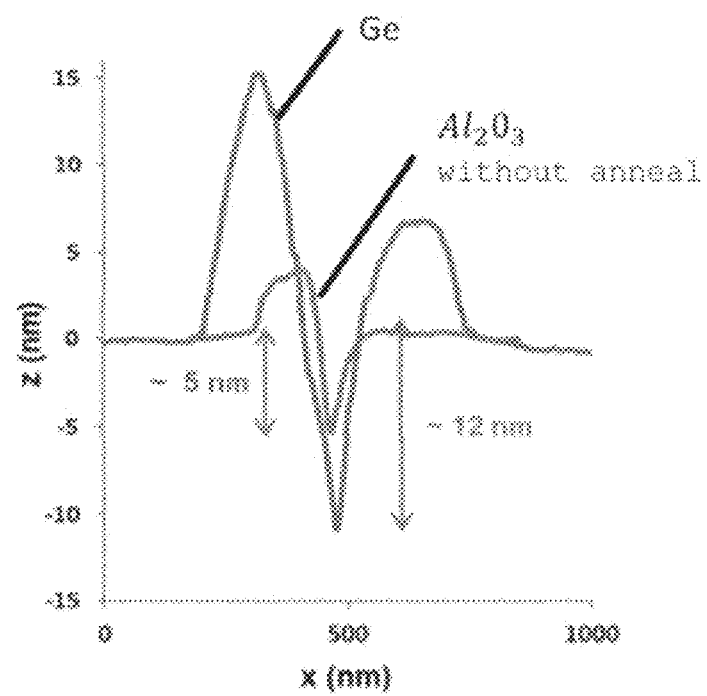
FIG. 4 two measurements of hardness by nano-indentation of different materials used in the manufacturing process of FIG. 1.
Figure 4:
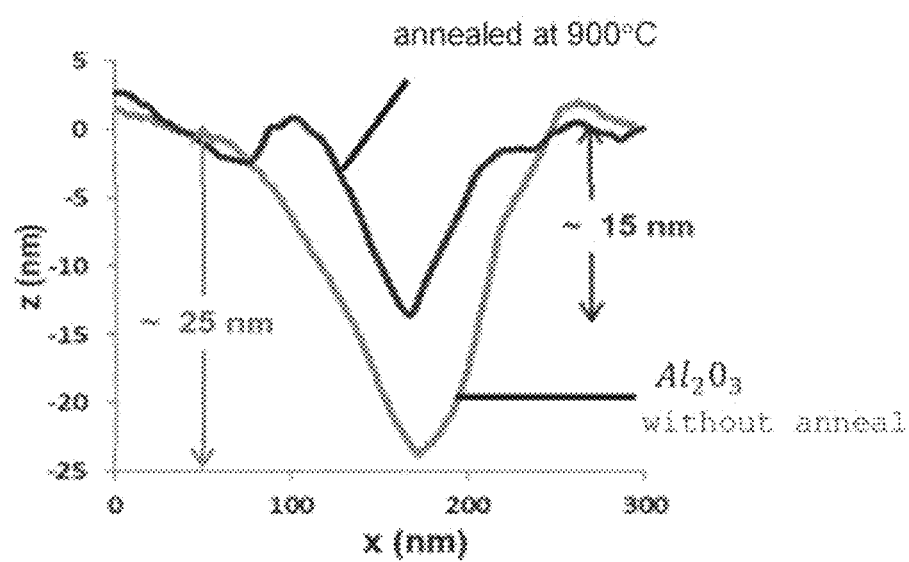

In order to study more precisely the effect of the conformal top layer on the hardness of the surface of the optical element (10), nano-indentation tests were carried out using an atomic force microscope (AFM). The principle consists in indenting, with a defined force, the material to be studied using a diamond tip (with a hardness comprised between 70 and 150 GPa), then in measuring the residual imprint with a tip having a smaller radius of curvature. Materials may then be classified by hardness, depending on the depth of the residual indentation: the harder a material, the shallower the indentation depth. Tests were carried out on the one hand on a silicon surface and on a silicon surface covered with amorphous alumina with a force of 350 μN, and on the other hand on a silicon surface covered with amorphous alumina and on a silicon surface covered with alumina annealed at 900° C. with a force of 500 μN. The results of the nano-indentation tests are presented in FIG. 4. The top graph shows the comparative measurement by AFM of the indentation of silicon and of amorphous alumina (without anneal) deposited on silicon by ALD. The depth of the residual indentation with a force of 350 μN is ~12 nm on the germanium and ~5 nm on the alumina. The depth of the residual indentation with a force of 500 μN is ~25 nm on the alumina without anneal and ~15 nm on the alumina after annealing at 900° C.

These measurements therefore make it possible to confirm that the hardness of the annealed alumina is greater than that of amorphous alumina, which is greater than that of silicon. Thus, the conformal top layer (6) of annealed alumina enables additional protection of the nanostructures, operation of the optical element (10) under severe environmental conditions and longer retention of the SH and AR properties.

In another embodiment the wavelengths of use are comprised in a wavelength range comprised between 100 nm and 25 μTn. In another embodiment, the nanostructured surface (4) (and the optical component (1)) of the optical element (10) is made of oxide glass, borosilicate, silicon, silica, halide, chalcogenide or ZnS, ZnSe or even polycarbonate. In another embodiment, the nanostructured surface is made of a material that is transparent in the visible spectrum (for example of BK-7 glass), the wavelength of use belonging to the visible spectrum.

In another embodiment the conformal top layer (5) may be made of any type of material which is transparent at the wavelength of use, which may be deposited in a conformal layer by ALD and which has a hardness greater than that of the material of the nanostructured surface (4). Preferably, the top layer has a hardness greater by at least 1.3 units on the Mohs scale than the hardness of the material of the nanostructured surface (4).

The invention claimed is:

1. An optical element, which is transparent at a wavelength of use λ, comprising a super-hydrophobic nanostructured surface that has an anti-reflection property, said surface comprising an array of pads, wherein the pads have a nanoscale width, a height h, an aspect ratio of less than 1/2, the pitch p of the array is such that p<h and the element comprises a top layer of thickness less than h/5 which covers without discontinuity and conformally said nanostructured surface, said top layer being obtained via a step of annealing at a temperature comprised between 500° C. and 1200° C. and being in a material of a hardness greater than the hardness of the material of said nanostructured surface.

2. The optical element as claimed in claim 1, wherein the pads are cylinders, cones, or truncated cones.

3. The optical element as claimed in claim 1, wherein the array of pads is periodic.

4. The optical element as claimed in claim 1, wherein the top layer is made of alumina, preferably in sapphire phase, of DLC or of $ZrO_2$.

5. The optical element as claimed in claim 1, wherein the nanostructured surface is made of germanium and the wavelength of use is comprised between 8 and 12 μm.

6. The optical element as claimed in claim 1, wherein the pads have an aspect ratio of less than 1/10.

7. The optical element as claimed in claim 1, wherein the thickness of the top layer is less than h/10.

8. The optical element as claimed in claim 1, wherein the material of the top layer has a hardness greater by at least 1.3 units on the Mohs scale than the hardness of the material of the nanostructured surface.

9. A process for manufacturing an optical element as claimed in claim 1, comprising the following steps:
   a. nanostructuring the array of pads on the surface of the optical element;
   b. depositing the top layer by atomic layer deposition, so as to cover the nanostructured surface conformally and without discontinuity.

10. The process for manufacturing an optical element as claimed in claim 9, comprising, after step b), a step c) of annealing the top layer at a temperature between 500° C. and 1200° C.

11. The process for manufacturing an optical element as claimed in claim 9, wherein the nanostructuring step, step a), comprises 3 sub-steps:
   i. placing a lithographed hard mask on the surface to be nanostructured;
   ii. etching via plasma, ionic or chemical etches or combinations of these techniques the array of pads on said surface to be nanostructured; and
   iii. removing the hard mask.

* * * * *